May 28, 1968 W. H. OLSON 3,384,983

COLOR APPARATUS AND SYSTEM

Filed May 6, 1966 2 Sheets-Sheet 1

Inventor
Walter H. Olson
By
McCanna, Morsbach + Pillote
Attorneys

Inventor
Walter H. Olson
By
McCanna, Morsbach + Pillote
Attorneys

United States Patent Office 3,384,983

Patented May 28, 1968

3,384,983

COLOR APPARATUS AND SYSTEM

Walter H. Olson, Rockford, Ill., assignor to The Valspar Corporation, Rockford, Ill., a corporation of Delaware Filed May 6, 1966, Ser. No. 548,109

24 Claims. (Cl. 35—28.5)

The present invention relates generally to color charts and systems, and more particular to a color chart and system for matching, selecting, and compounding colors in coating materials and the like.

For convenience, the improved color chart and system of the present invention is herein sometimes referred to as relating to paints and ingredients thereof; however, this is done by way of illustration and not limitation, and it should be understood that the invention can be used for inks, dyes, pigments, and the like.

A beam of white light can be broken up into a spectrum. The primary colors of light are red, green, and blue. The primary colors of pigments or dyes are yellow, blue, and red or more accurately yellow, cyan, and magenta. Thus the primary colors are red, yellow, green, and blue. Colors of purple hue form a transition between the ends of a spectrum and permit the arrangement of hues in the form of a circle (see FIG. 3) with each of these five hues spaced at a multiple of 72° on the circle. This method of classification was brought into widespread use by Von Helmholtz.

Munsell classified color according to three dimensions of hue, value, and chroma. Chroma is also known as saturation, brilliance, brightness, or grayness. Value is also known as lightness, darkness, or amount of light reflectance. For simplicity the three dimensions will be generally referred to herein as hue, saturation, and light reflectance. The colors in the Munsel system are arranged within each hue with the vertical dimension being light reflectance and the horizontal dimension being saturation.

Another widely known color system was developed by Ostwald. Other color systems and color charts have also been used. While many of these can be used to identify color, for the most part there has been no way to reproduce the identified color short of a trial and error method. Accordingly, it is an object of this invention to provide a color chart and system for easily reproducing selected colors.

Still other past color systems had a plurality of reproducible colors; however, the initial determination of a color was frequently extremely difficult. For example, assume that one desired to match a particular color on an existing object. Since it would be quite possible that such existing color could not be matched by a card, even in a very comprehensive directory, finding the one card of perhaps hundreds which most nearly matched the existing color could be a difficult problem. Therefore, it is another object of this invention to provide a color chart and system which can be used to quickly and accurately locate the color card which nearly matches the color of a given surface.

Yet another object is to provide a color card and system in accordance with the above and in which the cards are arranged in a systematic manner.

Still another object of this invention, related to the above, is to provide a color chart having hues of generally equal optical steps which allows one to estimate the approximate location of a color which falls between available color chips.

A further object is to provide such a color card and system as above and using commercially available materials and which are arranged in known chemical proportions.

A still further object is to provide a color card and system in which each color card is identified in a manner relating to its physical and chemical properties.

A yet further object is to provide a color card and system in accordance with the foregoing object and by which nearly every color can be identified in the system and economically reproduced.

Other objects are to provide a color system which cuts waste of materials, allows small quantities of colors to be produced profitably, produces exact colors and repeats color mixes accurately, reduces inventory and labor costs, and keeps thousands of colors available.

Still other objects and advantages of the present invention will become apparent as the same becomes better understood from the following detailed description when taken in conjunction with the accompanying drawings wherein.

Reference is now made more particularly to the drawings wherein similar reference characters indicate the same parts throughout the several views.

Figure 1:
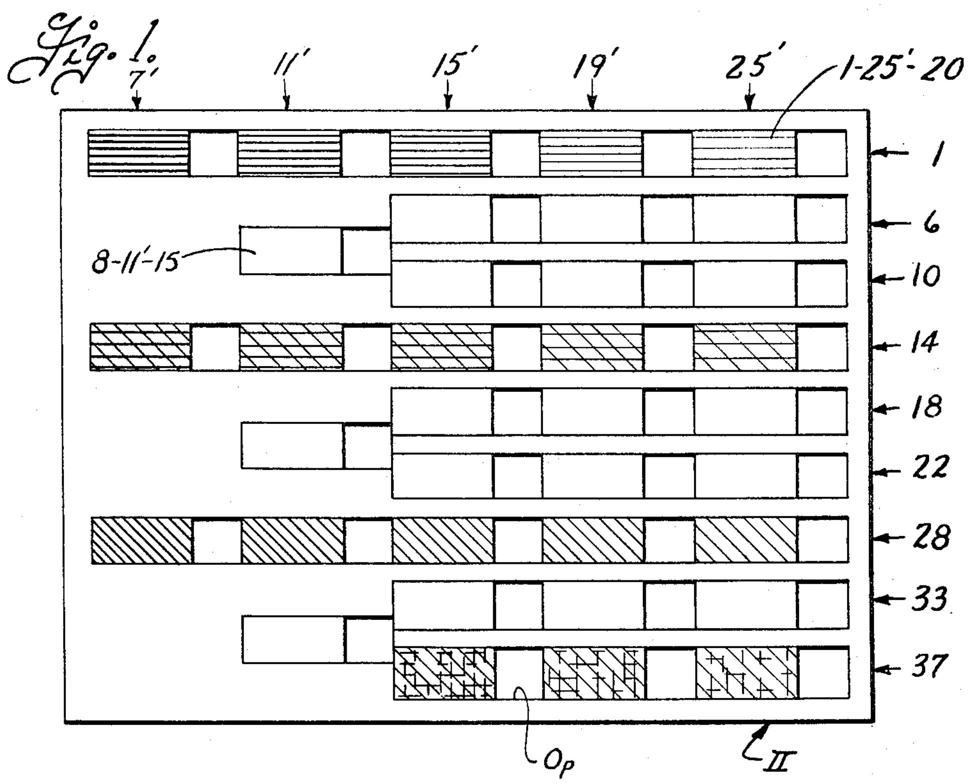
FIGURE 1 is a plan view of a color chart constructed in accordance with the present invention and embodying the system of the present invention.

In establishing the system of the present invention, a hue circle (FIG. 3) was first arranged. Commercially available colorants, stable under predetermined conditions of light and heat and adjusted to a definite tinting strength, were first selected. The basic colorants selected were phthalo blue, phthalo green, light chrome yellow, medium chrome yellow, molybdate (orange), magenta (red), violet, and indanthrone blue (violet-blue). These were placed on the hue circle in approximately equal optical spacing. The circle was then divided into 136 spaces from blue (1) to blue-violet-blue (136).

The colorants were then blended to provide a ratio corresponding to each number on the circle. For example, the colorant ratios from blue to green are as follows:

| | | | | | | | | | |
|---|---|---|---|---|---|---|---|---|---|
| 1 | Blue | | | | 15 | Blue | 2 | Green | 3 |
| 2 | Blue | 17 | Green | 1 | 16 | Blue | 1 | Green | 2 |
| 3 | Blue | 15 | Green | 1 | 17 | Blue | 2 | Green | 5 |
| 4 | Blue | 11 | Green | 1 | 18 | Blue | 1 | Green | 3 |
| 5 | Blue | 9 | Green | 1 | 19 | Blue | 1 | Green | 4 |
| 6 | Blue | 7 | Green | 1 | 20 | Blue | 1 | Green | 5 |
| 7 | Blue | 6 | Green | 1 | 21 | Blue | 1 | Green | 6 |
| 8 | Blue | 5 | Green | 1 | 22 | Blue | 1 | Green | 7 |
| 9 | Blue | 4 | Green | 1 | 23 | Blue | 1 | Green | 9 |
| 10 | Blue | 3 | Green | 1 | 24 | Blue | 1 | Green | 11 |
| 11 | Blue | 5 | Green | 2 | 25 | Blue | 1 | Green | 13 |
| 12 | Blue | 2 | Green | 1 | 26 | Blue | 1 | Green | 17 |
| 13 | Blue | 3 | Green | 2 | 27 | Blue | 1 | Green | 23 |
| 14 | Blue | 1 | Green | 1 | 28 | Green | | | |

This procedure was followed to complete the hue circle. If it is perceived that additional steps are desirable, a decimal can be added. Thus #5.5 would be a ratio of blue 8 to green 1.

As stated above, another dimension of color is saturation. A second number was established to indicate the saturation of a hue. Since black is no saturation, it was taken as a starting point. Twenty-five ratios from black to hue were established. The pure hue circle has the maximum saturation or brilliance achieved by the colorant used and is designated 25′. To prevent confusion with the hue numbers, saturation numbers are herein designated with the postscript prime ('). As more brilliant pigments become available or useable, numbers beyond 25' can be established. The brilliance ratios established are as follows:

| | | | | | |
|---|---|---|---|---|---|
| 1' | Pure Black | | 14' | Black 2 | Hue 5 |
| 2' | Black 16 | Hue 1 | 15' | Black 1 | Hue 3 |
| 3' | Black 8 | Hue 1 | 16' | Black 1 | Hue 4 |
| 6' | Black 7 | Hue 1 | 17' | Black 1 | Hue 5 |
| 5' | Black 5 | Hue 1 | 18' | Black 1 | Hue 6 |
| 6' | Black 4 | Hue 1 | 19' | Black 1 | Hue 7 |
| 7' | Black 3 | Hue 1 | 20' | Black 1 | Hue 8 |
| 8' | Black 5 | Hue 2 | 21' | Black 1 | Hue 12 |
| 9' | Black 2 | Hue 1 | 22' | Black 1 | Hue 16 |
| 10' | Black 3 | Hue 2 | 23' | Black 1 | Hue 24 |
| 11' | Black 1 | Hue 1 | 24' | Black 1 | Hue 32 |
| 12' | Black 2 | Hue 3 | 25' | | Hue |
| 13' | Black 1 | Hue 2 | | | |

In the above manner, pigment or colorant ratios are established for hue and saturation. The third dimension of color is light reflecteion which varies according to lightness of the hue and white content of the color. The light reflection can be determined by measurement on any colorimeter or photospectrometer that gives the result preferably according to Federal Testing Specification 141, Method 6121. The present invention, however, does not require any such expensive equipment as will become apparent. Each hue has a minimum amount of light it can reflect at each saturation livel. For example, a light yellow may reflect about 65% while a bright blue may reflect only 10%. Since white content also affects light reflectance, the amount of white in the base is important. For this purpose, three bases of different controlled white content were established. Once, called neutral or medium, is used as a starting point. Another, called light or opaque, has twice the white content of medium; and the third, called deep, has ½ the white content of medium. Using these bases, colors were produced and light reflectance was measured, as above. These colors were produced by the formula of 48 units of colorant equals one ounce, and colorant plus base equals one gallon of color. On this basis, a table of light reflectance was established. For example, the table for blue is as follows:

| Light Reflection Percent | Base | | |
|---|---|---|---|
| | Deep | Medium | Light |
| 5 to 8 | BL 576 | | |
| 9 to 11 | BL 480 | | |
| 12 to 14 | BL 384 | | |
| 15 to 18 | BL 240 | | |
| 19 to 22 | BL 192 | BL 384 | |
| 23 to 27 | | BL 336 | |
| 28 to 31 | | BL 288 | |
| 32 to 35 | | BL 240 | |
| 36 to 39 | | BL 146 | |
| 40 to 43 | | BL 152 | BL 304 |
| 44 to 47 | | BL 112 | BL 224 |
| 48 to 51 | | BL 72 | BL 144 |
| 52 to 55 | | BL 32 | BL 64 |
| 56 to 60 | | BL 26 | BL 52 |
| 61 to 65 | | | BL 40 |
| 66 to 69 | | | BL 28 |
| 70 to 74 | | | BL 16 |
| 75 to 78 | | | BL 8 |

It will be noted that the colors in the table are approximate to three degrees of light reflectance.

Under this system each color is given a numerical designation. For example, blue (1) of maximum saturation (25') and about 20% light reflectance, is designated 1–25'–20. A formula to reproduce this color is also determined as medium base, 384 units of hue per gallon, and no black. In similar manner, many thousands of colors are designated and the formula determined.

Figure 4:
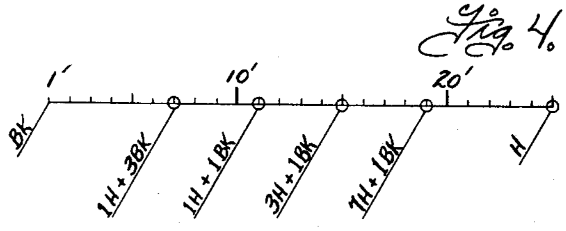
FIGURE 4 is a diagrammatic view of a saturation scale.

The optical difference between such thousands of colors, however, may not be readily observable. Additionally, while it is preferable to have indicia to identify thousands of colors, it is preferable to have a limited number of colors on a chart for selection by a user. To construct the color chart, then, colors of generally equal and observable optical steps were selected. For example, about every fourth hue was selected for blues and about every other hue for yellows. Saturation at steps 7', 11', 15', 19', and 25' were selected. Referring to FIG. 4 and the above saturation table, it can be seen that these are approximately equal steps and additionally provide advantage ratios of black content of ⅛ for 19', ¼ for 15', ½ for 11', and ¾ for 7'.

Using the medium base and the selected hues and saturations of generally equal optical steps and known ratios, a color chart was made embodying the invention. A color chip for each saturation was made and where black was required to reduce the saturation (i.e., at steps 7', 11', 15', and 19') an equal amount of hue colorant was subtracted so that the quantity of hue colorant and black equals the quantity of hue colorant at maximum saturation (step 25'). The total quantity of colorant or colorant and hue is generally a constant throughout the medium base. In this manner, steps between color chips are easily determined mathematically. "Short gallons," or one gallon minus the amount to be added, or other quantities of base can be pre-measured since the additives are constant for any color at that base. This results in economies of use of both base and colorants. The general formula, then, is 384 H+W, where H is colorant or colorant and black, W represents a "short gallon" of a base of controlled white content, there being 48 units per liquid ounce of colorant or black. More particularly, the steps of saturation referred to above can be designated by these formulas for steps 19', 15', 11' and 7', respectively: 336 H+48 Bk+W; 288 H+96 Bk+W; 192 H+192 Bk+W; and 96 H+288 Bk+W; where H is colorant, and Bk is black.

In the above manner, the hue circle was completed for medium base and the color chips were conveniently placed on four color charts. Since charts on either side of medium base are provided, the system can be diagrammatically shown as a color cylinder made up of a plurality of color circles A–E of increasing light reflectance. While other numbers are possible, five such color circles were chosen, comprising four charts each and were numbered I–XX. Thus, for example, I–V represents the same hues, but of increasing light reflectance from chart I to chart V. Medium base is utilized in circle B and while the chips therein are not of equal brilliance, as they would be in the well-known Helmholtz color solid, they do have the desirable property of equal white content and equal content of colorant or colorant and black.

Figure 3:
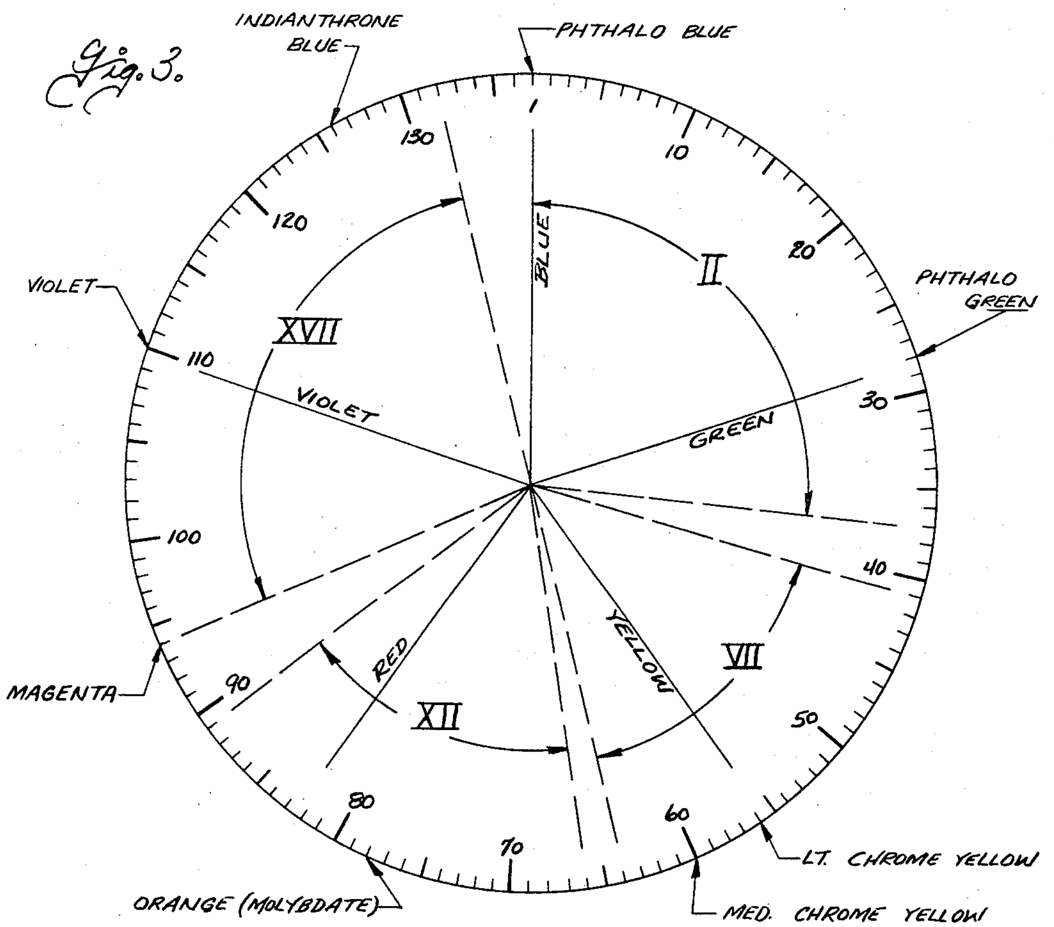
FIGURE 3 is a diagrammatic view of a hue circle.
Figure 5:
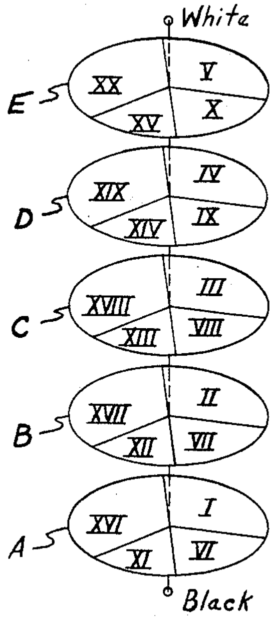
FIGURE 5 is a diagrammatic view of a theoretical color solid upon which the preferred embodiment of the present invention is based.

Referring to FIG. 1, there is illustrated a color card II which represents a preferred embodiment of the invention and conveniently contains color chips from blue to green as is also indicated by its relative position shown in FIG. 3. For illustrative purposes, a portion of the color chips is shaded to indicate color. The chips on color card II, for example, are advantageously arranged in lines or groups of hue, generally designated 1, 6, 10, 14, 18, 22, 28, 33, and 37, corresponding to the hue numbers on the color circle (FIG. 3). The chips are also arranged in columns of saturation, generally designated 7', 11', 15', 19', and 25', corresponding to saturation ratios previously described. In this manner, the chart is laid out in a generally rectangular coordinate system, and the system is continued at each circle A–E so that the chips can be said to generally form a color cylinder. It should be obvious that the terms "row" and "column" are used as illustrative and for clarity. Obviously, the chips could be in columns of hue depending on how the card is held, and the terms should not be taken as limited to horizontal rows and vertical columns. Percentage of light reflectance, previously described, is also indicated and each chip advantageously has an indicia (e.g. 1–25'–20) of its relative three dimensions. By using the above described formulas, each color can be reproduced. Preferably, columns 15′ and 19′ have the same number of chips as column 25′. At saturation 7′, however, there is a chip for only every third line since the optical difference becomes lesser as the saturation approaches black. At saturation 11′ there is a chip for the same every third line plus an additional chip generally midway between each two chips. Each additional chip preferably corresponds to a designated hue, thereby also fitting into the system, for example, chip 8–11′–15 shown in FIG. 1. In this manner, approximate optical differences are maintained between chips.

Figure 2:
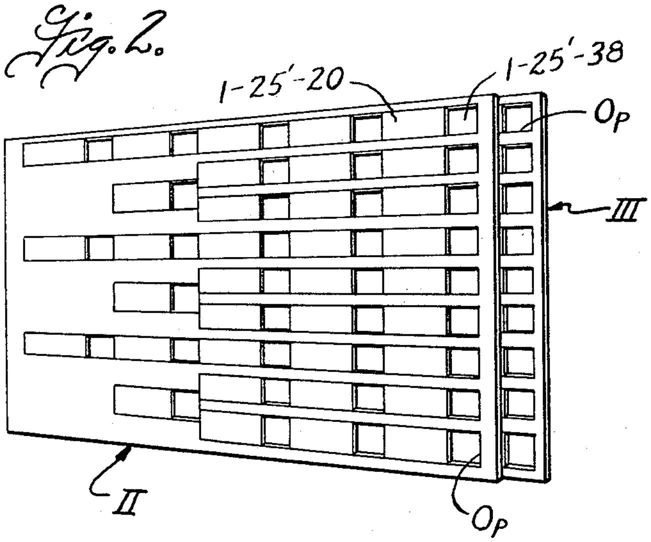
FIGURE 2 is a perspective view of a pair of color charts.

Preferably the above pattern is repeated for each card in the set comprising cards I–V and also in each other set, thereby totalling twenty color charts. It can be seen that each chart contains 36 color chips and the total individual chips is 720. In one embodiment, the color chips were prepared under simulated field conditions. Bases of the same white strength as the above described bases were tinted in accordance with the system and the resultant colors were roller coated on 90# white clay-coated paper and subjected to moderate drying temperatures. These were conveniently placed, in the above order, on cardboard sheets. Preferably each color chip has an opening Op adjacent thereto for viewing other objects and comparing the object immediately adjacent to the chips. Such objects may be a surface for which it is desired to identify the color, or it may be another chart in the set, as chart III. For example, chip 1–25′–38 on chart III can easily be seen adjacent chip 1–25′–20 on chart II, as shown in FIG. 2. By staggering the charts slightly, all color chips in a set can be viewed simultaneously. It is contemplated that other means can be provided for viewing objects through the various color charts.

Applying the above to colors in circles C–E, the light base (twice the white content of the medium base) was used and chips of different light reflectance were made, corresponding in hue and saturation to each chip in circle B. For circle C, the general formula 192 H+W″ was used, where W″ is light base. In a manner similar to that described above, the formulas for the various saturations are as follows: 168 H+24 Bk+W″, 144 H+48 Bk+W″, 96 H+96 Bk+W″, and 48 H+144 Bk+W″. Since the light base is double strength, and the amount of colorant or colorant and black is one-half of circle B, the percentage of colorant and black content to white content in circle C is about one-quarter the percentage in circle B. Similarly, circle D is based generally on the formula 64 H+W″ or about one-third the percentage of circle C, and circle E is based generally on the formula 16 H+W″ or about one-quarter the percentage of circle D.

Applying the above to colors in circle A, the deep base (one-half the white content of the medium base) was used and chips of lesser light reflectance were made, one corresponding in hue and saturation to each chip in circle B. The general formula for circle A is 576 H+W′ where W′ is deep base. Since the deep base is one-half strength, and the amount of colorant or colorant and black is 1.5 times that incircle B, the percentage of colorant and black content to white content in circle A is about three times that in circle B. In order to achieve a wider range of color in the red and yellow ranges of circle A, however, bases containing red or yellow pigment were advantageously utilized. It is possible to thereby achieve colors that would take more than an economical or practical quantity of colorant. These bases have been placed in the system through determinations as described above, so as to achieve continuous results that fit into the optical-chemical relationships.

A great problem in color tinting is the economical use of pigments. Since bright pigments are usually the most expensive, it is imoprtant that pigments of lesser brightness such as red, yellow and brown ovides be used wherever possible. Because previous tinting methods often left much to the discretion of the tinter, it was not always possible to achieve the economies possible in the use of oxides. With the present invention, it is possible to achieve the same basic pattern as hue and black. Because the black causes a loss of saturation or brightness with less pigment, it is possible to use greater quantities of the oxides in the present invention. For example, the colorant ratio of color 85–15′ is 1.5 red+1.5 orange+1 black. This color can be produced more economically using only red oxide. On chart XII, for example, the formula is 384 units of red oxide+W (a "short gallon" of medium base). In a similar manner, brown oxide fits into the present invention at hue 81, saturation 7′, and yellow oxide or sienna at hue 60, saturation 15′. Obviously these less expensive oxide colorants can be used as substitutes for portions of other neighboring colors.

The invention utilizes three bases, eight bright pigments, black (lamp black) and three oxide pigments. In a similar manner, other pigments can be worked into the system, even brighter pigments when available.

An ordinary person usually identifies a color first of all by its hue (red, blue, etc.). For this reason, the color charts of the present invention have an advantage over many others presently available since many hues are observable on each chart. To locate a color on a chart of this invention, first determine its approximate hue. The charts are divided into four sets of five guides each. Thus one set can usually be immediately selected. Next the approximate light reflectance of the sample will determine which chart is closest in value. Last, choose the chip which is of closest brilliance or saturation. At this point the indicia can be used to select a formula for reproducing the color.

If a color is not specifically shown on the charts or guides, first select the closest color chip. Now by judgment and interpolation, locate the color between two chips on one guide or between two guides. The rectangular coordinate system and the same quantity of chips for each tint aids in this procedure. If there is a variable in hune, the sample should be given a number between the two colors. Note that the hue numbers skip depending on the number of color formulas available. For instance, if the sample was between 28 and 33—it could be 29, 30, 31 or 32. It will depend on individual judgment to determine which of these it is. If the sample color is located between two saturations, an interpolated number between should be used; for instance, if the color is between 19′ and 15′ it could be 18′, 17′ or 16′. If the light reflectance of the sample has been determined, reference can be made directly to the light reflectance table. If it has not been determined and the sample is between two guides the light reflectance should be compared with the guides lighter and darker than the sample and a percentage estimated. The color descriptive numbers that are thus established will determine the starting point formula.

The invention in its broader aspects is not limited to the preferred embodiment shown and described, but departures can be made therein within the scope of the accompanying claims without departing from the principles of the invention and without sacrificing its chief advantages.

What is claimed is:

1. A color chart comprising a sheet member having one group of color chips having a generally equal white content and arranged in an orderly manner according to saturation, one chip having a measured quantity of colorant, a second chip having a portion of the colorant replaced by black to produce a shade of the one chip, at least one other chip having a different portion of the colorant replaced by black to produce a different shade of the one chip, and each of the shaded chips having an amount of colorant plus black generally equal to the quantity of colorant in the one chip.

2. A color chart as set forth in claim 1 including a plurality of other groups of color chips having a white content generally equal to the white content of said one group, each other group including one chip having a measured quantity of colorant of another hue and a shaded chip of said other colorant and black corresponding to each shaded chip of said one group, each said one chip and shaded chip having a quantity of colorant and black generally equal to the corresponding chip in the one group, each group arranged substantially collinear according to saturation, and the groups arranged with said corresponding chips adjacent and in order of at least a portion of a color circle.

3. A color chart as set forth in claim 1 wherein said one group is arranged collinear along one axis on the sheet member, and including a plurality of other color chips each of a different hue and of generally equal white and colorant content as said one chip and arranged in order of a color circle along the other axis on the sheet member, additional color chips equal in number as said plurality and of generally equal white, colorant and black content as said second chip, each additional color chip positioned according to a rectangular coordinate of hue and saturation.

4. A color chart as set forth in claim 3 wherein the sheet member has an opening therein adjacent each color chip for viewing an article therethrough.

5. A color chart as set forth in claim 1 including a plurality of groups each of different hue and each having a color chip corresponding in white, colorant and black content to each chip in said one group, said chips arranged in a rectangular coordinate system with one axis being hue in the order of the color circle and the other axis being saturation, additional chips having a white content generally equal to the other chips and an increased amount of colorant replaced by black, and said additional chips being arranged on the sheet member according to the coordinate system.

6. A color chart as set forth in claim 1 wherein the amount of colorant replaced by black in each succeeding chip is in the range of about ⅛ to ¼.

7. A color chart as set forth in claim 2 wherein the difference in hue between each adjacent group is approximately an equal visual difference.

8. A color chart as set forth in claim 2 which contains hues corresponding to a portion of the color circle and including additional similarly arranged charts having generally equal white, colorant, and black content and having color chips of different hues to complete the color circle.

9. A color chart as set forth in claim 1 and including a second similarly arranged color chart having a color chip thereon corresponding in hue and saturation to each chip in said one group and differing therefrom by a difference in the percentage of colorant and black content to white content.

10. A combination as set forth in claim 9 wherein the ratio between the chart having the smaller percentage and the chart having the larger percentage is in the range of about ¼ to ⅓.

11. A combination as set forth in claim 9 wherein the color chips on each chart have a generally equal colorant and black content.

12. A color chart as set forth in claim 5 and including a second similarly arranged color chart having a color chip thereon corresponding in hue and saturation to each chip on the first color chart and differing therefrom by a percentage of colorant and black content to white content.

13. A combination as set forth in claim 12 wherein the hue axis on said first and second color charts corresponds to a portion of the color circle, and including additional pairs of charts corresponding to other portions of the color circle.

14. A color chart as set forth in claim 1 wherein each color chip is reproduceable on the basis of the formula 384 H+W=one gallon, where H represents colorant and black and W represents a white base, there being 48 units of H per liquid ounce.

15. A color chart as set forth in claim 14 wherein there are five color chips in said group, said one chip having only colorant for H, and said other chips having black content in the steps of ⅛, ¼, ½ and ¾.

16. A color chart as set forth in claim 14 and including a second color chart of the same hue and having a color chip corresponding to each color chip of the first chart, each second card chip reproduceable on the basis of the formula 576 H+W′=one gallon, where W′ represents a base having one-half the white content of W.

17. A color chart as set forth in claim 14 and including an additional color chart of the same hue and having a color chip corresponding to each color chip of the first chart, each additional card chip reproduceable on the basis of the formula 16 H+W″=one gallon, where W″ represents a base having double the white content of W.

18. A color chart comprising a sheet member having a plurality of color chips thereon having a generally equal white content, said chips arranged in a rectangular coordinate pattern with columns of approximately equal saturation and rows of the same hue, the column of maximum saturation and the column adjacent thereto having equal numbers of color chips therein.

19. A color chart as set forth in claim 18 and including additional color charts similarly arranged, each color chart having color chips thereon corresponding to the same hues as the chips on the other charts and thereby making a set of color charts, the color chips on each chart having a generally equal white content and each chart differing from the other charts by a difference in percentage of white content.

20. A set of color charts as set forth in claim 19 wherein the hues on said charts correspond to a portion of the color circle, and including additional sets of color charts to complete the color circle.

21. A color chart as set forth in claim 18 wherein the hue composition of the color chips in the column of maximum saturation comprises a commercially available colorant and blends of such colorants, said blends being optically arranged in the order of the color circle and each having an indicium to designate its relative position thereon.

22. A color chart as set forth in claim 21 wherein the column of maximum saturation has a saturation indicium, and the columns of lesser saturation each has a portion of the colorant replaced by black in preselected steps and each has an indicium to designate amount of saturation.

23. A color chart as set forth in claim 22 wherein each color chip has an indicium to designate light reflectance whereby the three indicia identify the three dimensions of each color chip.

24. A color chart as set forth in claim 22 wherein a portion of said chips have at least a portion of their colorant and black content replaced by an oxide colorant.

References Cited

UNITED STATES PATENTS

| | | | |
|---|---|---|---|
| 918,068 | 4/1909 | Maratta | 35—28.5 |
| 1,597,830 | 8/1926 | Rueger | 35—28.3 X |
| 1,966,987 | 7/1934 | McCrudden. | |
| 2,866,277 | 12/1958 | Wise | 35—28.3 |
| 3,000,113 | 9/1961 | Olson | 35—28.3 |
| 2,409,285 | 10/1946 | Jacobson. | |
| 2,729,898 | 1/1956 | Rahr. | |
| 2,866,277 | 12/1958 | Wise. | |

EUGENE R. CAPOZIO, *Primary Examiner.*

H. S. SKOGQUIST, *Assistant Examiner.*